United States Patent Office 3,404,972
Patented Oct. 8, 1968

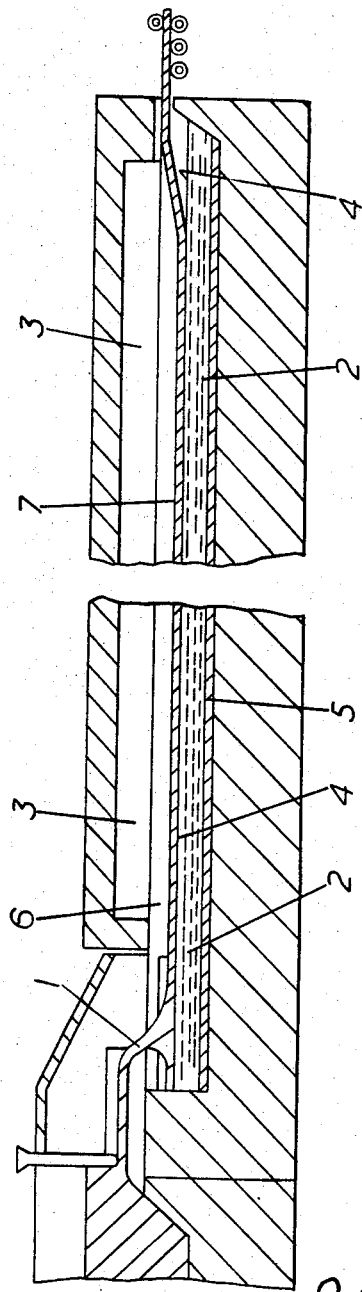

3,404,972
METHOD OF AND APPARATUS FOR THE MANUFACTURE OF FLAT GLASS ON A MOLTEN METAL BATH
John Graham Banner, Meols, Hoylake, and Norman Aidan Murphy, Wilton, Liverpool, England, assignors to Pilkington Brothers Limited, Liverpool, England, a company of Great Britain
Filed Mar. 30, 1965, Ser. No. 443,920
Claims priority, application Great Britain, Apr. 2, 1964, 13,740/64
6 Claims. (Cl. 65—65)

ABSTRACT OF THE DISCLOSURE

Flat glass in ribbon form is manufactured on a bath of molten metal, e.g. tin, which is contained in a tank structure which presents to the molten metal a retaining surface of a material more readily oxidisable than the metal of the bath, e.g. a graphite surface.

---

This invention relates to the manufacture of flat glass in continuous ribbon form. Heretofore it has been proposed to produce flat glass in continuous ribbon form on a bath of molten metal, usually molten tin, and in the production of the ribbon of glass, surface areas of the bath become exposed, for example where the glass is taken from the bath by pick-up rolls, there is a triangular space, as viewed in elevation, between the glass and the bath which is exposed.

Sometimes in the production of glass in continuous ribbon form, surfaces of the bath are exposed to each side of the ribbon of glass. The exposed surface of the bath can lead to the production of contaminants for the glass by chemical reaction which forms compounds of the metal of the bath, the contaminants arriving at the interface between the glass and the bath and leading to contamination of the glass.

The main object of the present invention is to minimise the arrival of contaminants for the glass at the interface.

In accordance with the present invention, the molten bath is contained within a tank structure presenting a retaining surface to the bath, which surface is either more readily oxidisable than the metal of the bath or has a greater affinity for oxygen than has the metal of the bath.

In a preferred embodiment according to the present invention, the more readily oxidisable surface of the tank structure extends at least to the level of the surface of the bath. Where the surface so provided in the tank structure is above the level of the bath surface, the extent of the surface is such as to combat any tendency in the exposed surface of the metal bath to react with the atmosphere and form contaminants as already explained.

In order that the invention may be more clearly understood, reference will now be made to an embodiment of the invention in which the ribbon of glass is produced on the surface from molten glass supplied to the surface at one end, usually referred to as the hot end of the bath, the molten glass being advanced partly by momentum and partly by a traction effort directed longitudinally of the ribbon produced so that the molten glass fed to the bath is converted into a continuous ribbon form and advanced under conditions such that it can be removed from the bath without harm to the glass.

In the accompanying diagrammatic drawing, molten glass 1 is fed to the bath 2 and as it is advanced permitted lateral movement while it is advanced, even though the rate of lateral movement is constrained at the beginning of the movement. In any case, the glass is permitted lateral movement to the desired degree, while the glass is out of contact with any constraining element.

It is believed that at the hot end of the bath there is a greater tendency for reaction to occur between gases in the headspace 3 and in the bath and the surface 4 of the molten bath, and at this end of the bath it is considered preferable to provide a graphite surface 5 to the floor of the tank and to extend the carbon surface 6 presented to the bath by the side walls for the full depth of the bath and also above the level of the surface of the molten bath. Consequently the tank structure presents to the bath comparable surface areas of carbon from the floor of the tank and from the top of the tank structure to the level of the bath, and for the depth of the bath.

Further down the bath as the glass 7 cools, the surface may terminate at or near the level of the bath and not extend to the full depth of the molten metal comprising the bath. In operating an installation for producing flat glass in continuous ribbon form on a molten bath as hereinbefore mentioned, it is found that, with the presence of the surfaces which have a greater affinity for oxygen than has tin, contaminants for the glass are substantially eliminated.

Experiments have shown that the surface is easily produced from carbon or from graphite, and the present invention comprehends a selection of those materials for the surface which protects the molten bath against the arrival of contaminants for the glass at the interface. Experiments have also shown that, when surfaces of the tank structure are manufactured as herein described, much greater freedom of choice is permitted as regards the gases which may be present over the molten bath.

Generally speaking, the ordinary refractories may be employed for the wall structure, and only a facing of carbon or graphite applied to the refractory structure, in order to present the desired surface to the molten bath. In such an arrangement, not only is the normal strength of the tank structure assured, but there is also the protection from the walls of the tank against contaminants of the molten metal.

Summarising therefore the present invention comprises a method of manufacting flat glass in ribbon form on a bath of molten tin, wherein the tin is confined by a material having a greater affinity for oxygen than the tin in the circumstances of the manufacture of the flat glass.

More particularly, there is provided in the manufacture of flat glass in ribbon form on a bath of molten tin in which the surface of the molten tin is exposed during the production of the flat glass, the step of forming the walls of the confining structure holding the molten tin of graphite or carbon at parts of the bath where there is an exposed surface of molten tin.

The present invention also comprises the ribbon of glass produced according to the method of production herein described, and sheets of glass cut therefrom.

We claim:
1. In the art of forming a ribbon of glass on a molten metal bath which is of relatively shallow depth, the glass being maintained from a hot end to a cool end of the bath as a ribbon of such width as to permit lateral movement thereof, the method of minimising the amount of oxygen contamination at the lower face of the glass which comprises diffusing such contamination downwardly through the bath from the lower surface of the ribbon which brings the oxygen contaminants into contact with a graphite or other carbon surface beneath substantially the entire extent of at least a hot portion of the bath whereat said oxygen contaminants are deoxidised by said surface.

2. A method as in claim 1 wherein oxygen contaminants are also diffused downwardly and laterally to bring them into contact with a graphite or other carbon surface at least at the lower portions of the sides of the bath and at least at the hot portions of the bath so as to neutralise additional oxygen contaminants.

3. A method as in claim 2 wherein said bath contains molten tin and said contaminants are diffused into contact with graphite surfaces.

4. Apparatus for forming a ribbon of glass on a molten metal bath having an inlet for supplying molten glass to a hot end and an outlet for the ribbon of glass from a cool end comprising a relatively shallow tank for said bath including side walls and a floor, at least the surface of said floor being composed of graphite or other carbon at least at the hot end of the bath for the deoxidation of oxygen contaminants diffused downwardly through the bath from the lower surface of a ribbon of glass.

5. Apparatus as in claim 4 wherein said side walls are composed of graphite or other carbon at least at their lower portions and at least at the hot end of the bath.

6. Apparatus as in claim 5 wherein the surfaces of the floor and side walls at least at the hot end of the bath are composed of graphite.

References Cited
UNITED STATES PATENTS 3,266,880   8/1966   Pilkington _____ 65—374 X DONALL H. SYLVESTER, *Primary Examiner.*

A. D. KELLOGG, *Assistant Examiner.*